United States Patent [19]
Shinozaki et al.

[11] Patent Number: 5,963,359
[45] Date of Patent: Oct. 5, 1999

[54] WAVELENGTH CONVERSION DEVICE EMPLOYING NON-DIFFRACTING BEAM

[75] Inventors: Keisuke Shinozaki; Chang-Qing Xu; Hironori Sasaki, all of Tokyo, Japan

[73] Assignee: OKI Electric Industry Co., LTD., Tokyo, Japan

[21] Appl. No.: 08/876,485

[22] Filed: Jun. 16, 1997

Related U.S. Application Data

[63] Continuation of application No. 08/588,465, Jan. 18, 1996, abandoned.

[30] Foreign Application Priority Data

| Jan. 31, 1995 | [JP] | Japan | 7-014636 |
| Jul. 27, 1995 | [JP] | Japan | 7-192184 |

[51] Int. Cl.⁶ .................................................. G02F 1/37
[52] U.S. Cl. ........................ 359/326; 359/328; 359/565
[58] Field of Search ........................... 359/326–332, 359/558, 559, 562, 565; 372/21, 22; 385/122, 27

[56] References Cited

U.S. PATENT DOCUMENTS

| Re. 35,215 | 4/1996 | Waarts et al. | 359/328 X |
| 4,630,274 | 12/1986 | Schäfer | 372/9 |
| 4,887,885 | 12/1989 | Durnin et al. | 359/559 |
| 5,208,881 | 5/1993 | Bruesselbach | 385/27 |
| 5,233,620 | 8/1993 | Shinozaki et al. | 372/22 |
| 5,247,528 | 9/1993 | Shinozaki et al. | 372/22 |
| 5,355,246 | 10/1994 | Tanuma | 359/326 |
| 5,355,247 | 10/1994 | Byer et al. | 359/330 |
| 5,377,291 | 12/1994 | Hatakoshi et al. | 385/122 |

FOREIGN PATENT DOCUMENTS

| 0 503 595A2 | 9/1992 | European Pat. Off. . |
| 0 525 801A2 | 2/1993 | European Pat. Off. . |
| 42 19 908A1 | 1/1993 | Germany . |
| 4-145412 | 5/1992 | Japan . |
| 5-11297 | 1/1993 | Japan . |
| 5-66440 | 3/1993 | Japan . |
| 5-257184 | 10/1993 | Japan . |

OTHER PUBLICATIONS

Takehiko Hidaka, Generation of a Diffraction–Free Laser Beam Using a Specific Fresnel Zone Plate, vol. 30, No. 8 Aug. 1991, pp. 1738–1739, *Japanese Journal of Applied Physics* .

Sahara et al., "Waveguide–Type Quasi–Phase–Matching SHG Element,"0 plus E Apr., 1993, pp. 60–65.

Durnin, et al., "Diffraction–Free Beams," Physical Review Letters vol. 58, No. 15, Apr. 13, 1987 pp. 1499–1501.

Uehara, "Diffraction–Free Laser Beams," Oyo Butsuri, vol. 59, 1990. [No month] pp. 746–750.

Nakamura, "Annular Optical Systems," O plus E, Sep., 1992 pp. 84–89.

Applied Physics Letters, vol. 17, No. 11 (Dec. 1970) pp. 483–485, Bloembergen et al.

R. Tanuma et al., "Axicon–focused noncritically phase–matched second–harmonic generation", Japanese Journal of Applied Physics, Part 1, 1989, Japan, vol. 28, No. 8, pp. 1521–1522, Aug. 1989.

J.W.Y. Lit. Dept. "The Depth of Field of an Axicon", Abstracts of Papers of the 38th ACFAS Congress, Quebec, Canada, ACFAS, Canada, p. 45, Oct. 1970.

K. Shinozaki et al, "A comparison of optical second–harmonic generation efficiency using Bessel and Gaussian beams in bulk crystals", Optics Communications, vol. 133 (1997). Jan. 1997, pp. 300–304, Jan. 1997.

*Primary Examiner*—John D. Lee
*Attorney, Agent, or Firm*—Rabin & Champagne, P.C.

[57] ABSTRACT

A non-diffracting beam generator converts coherent light from a semiconductor laser into a small, intense, non-diffracting beam, which is directed into a non-linear optical element. The non-linear optical element converts this beam to light of a different wavelength. The non-linear optical element is a bulk element, not having an internal waveguide, and not requiring precise alignment of the non-diffracting beam. The non-diffracting beam preferably has a length matching the thickness of the non-linear optical element.

31 Claims, 10 Drawing Sheets

WAVELENGTH CONVERSION DEVICE EMPLOYING NON-DIFFRACTING BEAM

This application is a Continuation of application Ser. No. 08/588,465, filed Jan. 18, 1996 (now abandoned).

BACKGROUND OF THE INVENTION

The present invention relates to a method and device for converting the wavelength of light emitted from a semiconductor laser diode.

Crystals of non-linear optical materials such as lithium niobate ($LiNbO_3$) are known to convert coherent light of one wavelength to light of another wavelength, such as the second-harmonic wavelength. Infrared light emitted by a semiconductor laser can be converted to blue light in this way. This capability has important implications for optical information storage, because the shorter wavelength of blue light increases the storage density, and for laser printing, where the shorter wavelength yields higher dot resolution.

Simply placing a bulk non-linear optical crystal in the path of a coherent beam does not lead to efficient wavelength conversion, however. Conversion efficiency depends on the distance traveled by the beam in the crystal (the longer, the better) and the beam intensity (the higher, the better). Even if coherent light is focused to a small, intense beam spot when it enters a crystal, diffraction quickly causes the beam to spread inside the crystal, so that the high intensity necessary for efficient conversion cannot be maintained for any appreciable distance.

The usual solution to this problem has been to fabricate a waveguide in the non-linear optical crystal. While propagating through the waveguide, the coherent beam maintains a substantially constant intensity, without spreading, and highly efficient conversion becomes possible. Many wavelength conversion devices of this type have been described. Besides having a waveguide, these devices often have a periodic domain inversion structure to correct the phase mismatch that occurs as wavelength conversion proceeds. Another common feature is a reflective structure that returns part of the incident light to the semiconductor laser as optical feedback, to control the lasing wavelength.

Wavelength conversion devices of the waveguide type are difficult to manufacture, however, because of the precise positional alignment needed to couple the laser beam into the waveguide.

SUMMARY OF THE INVENTION

It is accordingly an object of the present invention to achieve efficient wavelength conversion without the need for precise positional alignment.

Another object of the invention is to obtain, as an optical output following wavelength conversion, a parallel beam of small diameter.

The invented wavelength conversion method and device employ a beam of the non-diffracting type first described by Durnin et al. in 1987. The invented method comprises the steps of creating a non-diffracting beam from the output of a semiconductor laser, and directing the non-diffracting beam into a bulk non-linear optical element. The invented device comprises a non-diffracting beam generator and the bulk non-linear optical element. A non-diffracting beam propagates naturally without spreading, so no waveguide is required in the non-linear optical element, and precise positional alignment of the non-diffracting beam is unnecessary.

The non-diffracting beam generator preferably has features adapted for improved wavelength conversion of light emitted from a semiconductor laser. These features include the following:

a wavelength-dependent reflective structure for returning part of the laser light to the semiconductor laser, for wavelength control;

a phase shifter for shifting the phase of part of the laser light to compensate for phase-matching error in the non-linear optical element;

a first optical system for focusing the light emitted by the laser to a small, annular image; and a second optical system for creating, from the annular image, a non-diffracting beam having a length equal to the thickness of the non-linear optical element.

Particularly when the length of the non-diffracting beam matches the thickness of the non-linear optical element, the converted light is obtained in the form of a divergent tubular beam. The invented device preferably also comprises an optical system for parallelizing this divergent tubular beam, focusing the resultant tubular parallel beam to a super-resolved spot, and collimating light from the super-resolved spot to create a parallel output beam of small diameter.

DETAILED DESCRIPTION OF THE INVENTION

Embodiments of the invention will be described with reference to the attached illustrative drawings. The drawings are schematic, and should not be construed as accurately depicting the shapes, sizes or positional relationships of the component elements, or as limiting the scope of the invention.

First Embodiment

Figure 1:
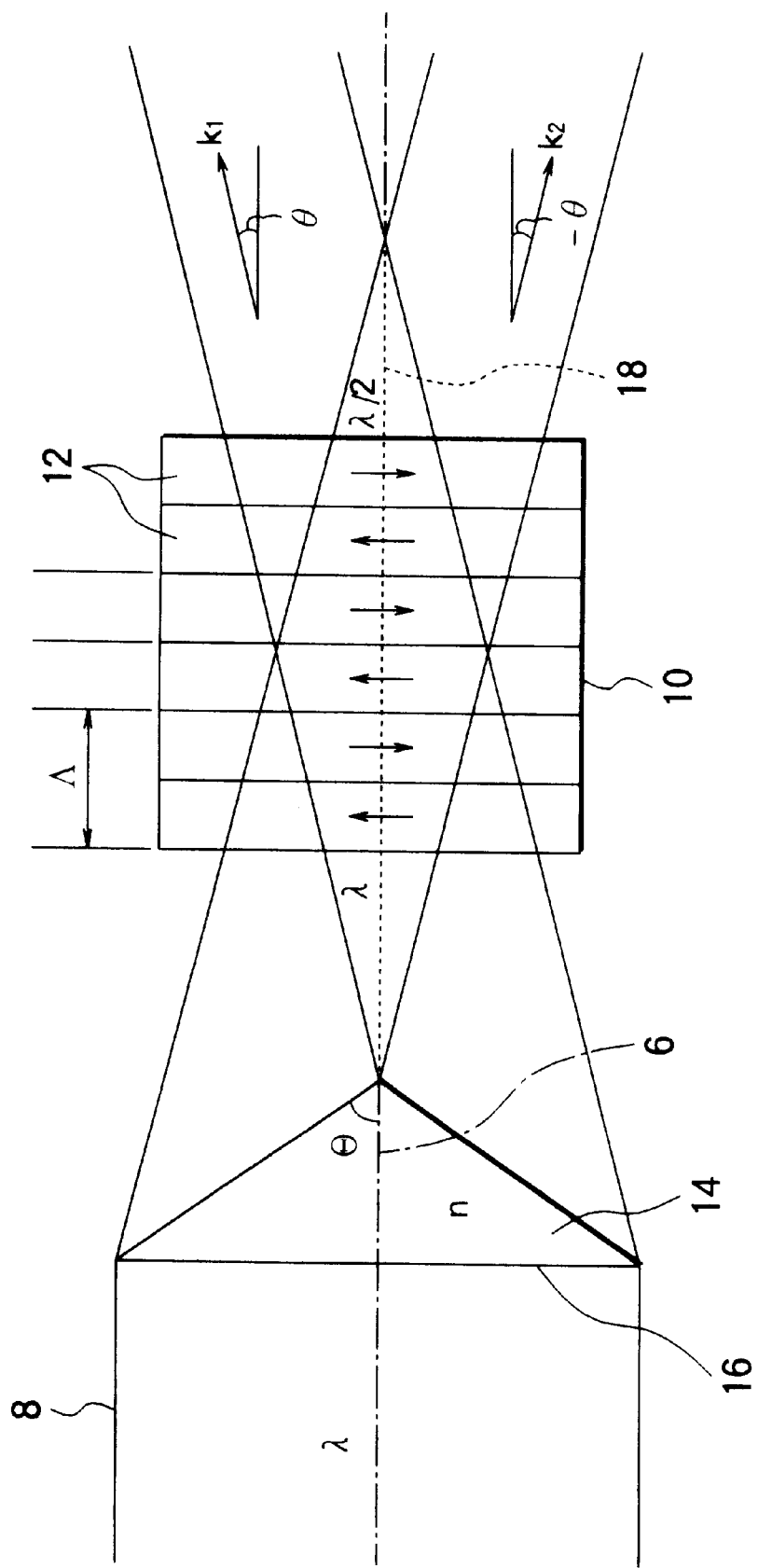
FIG. 1 illustrates the structure of a first embodiment of the invention.

The first embodiment is shown in FIG. 1. Reference numeral 6 identifies the optic axis. Reference numeral 8 identifies a beam of coherent light that has been emitted by a semiconductor laser and collimated by, for example, a convex lens so as to propagate parallel to the optic axis 6. To simplify the drawings, the semiconductor laser and collimating lens have been omitted.

The non-linear optical element 10 in the first embodiment is a laminated bulk crystal of, for example, $LiNbO_3$, having a periodic domain inversion structure. The periodic domain inversion structure comprises domains 12 with alternately reversed natural polarization directions, as indicated by short arrows in the drawing. All of these domains 12 have the same thickness. The domains 12 are formed by successive deposition of thin films.

The non-diffracting beam generator in the first embodiment is an axicon lens 14 that has a flat surface 16 normal to the optic axis 6. The coherent light 8 is received on this surface 16. The opposite face of the axicon lens 14 has the form of a circular cone with its apex on the optic axis 6. The coherent light 8 is refracted at this conical surface toward the optic axis 6 at a uniform angle $\theta$, which is related to the refractive index n and apex angle $\Theta$ of the axicon lens 14 by the following equation.

$$\theta = \Theta - \cos^{-1}(n\cos\Theta)$$

In the plane of the drawing sheet, the light directed onto the optic axis 6 consists of two intersecting plane waves with wave vectors $k_1$ and $k_2$. If $\lambda$ is the wavelength of the coherent light 8, then these wave vectors can be expressed as follows.

$$k_1 = (2\pi/\lambda)(\cos\theta, \sin\theta)$$

$$k_2 = (2\pi/\lambda)(\cos\theta, -\sin\theta)$$

Interference between these two plane waves, and between similar pairs of waves in all other planes containing the optic axis 6, creates a non-diffracting beam 18, indicated by a dashed line in the drawing, in the immediate vicinity of the optic axis 6. The diameter of the non-diffracting beam 18 is comparable to $\lambda$, the wavelength of the coherent light 8, which wavelength is about one micrometer (1 $\mu$m) for a semiconductor laser emitting in the near infrared. More precisely, the diameter of the Airy disc of the non-diffracting beam 18, in which most of the beam energy is concentrated, is comparable to this value. The beam diameter remains substantially unchanged over the entire length of the non-diffracting beam 18.

If constant terms are omitted, the electric field of the non-diffracting beam 18 approximates the field given by the following equation, which describes an ideal non-diffracting beam.

$$E(x, y, z, t) = \exp[i(\beta z - \omega t)]J_0(\alpha\rho)$$

The origin of the coordinate system used in this equation is at the apex of the axicon lens 14. The positive z-axis extends to the right along the optic axis 6. Distance from the z-axis or optic axis 6 is denoted by $\rho$. so that $\rho = (x^2 + y^2)^{1/2}$. The angular frequency of the non-diffracting beam 18 is $\omega$, and $\alpha$ and $\beta$ are constants such that $\alpha^2 + \beta^2 = (\omega/c)^2$, where c is the speed of light in a vacuum.

The amplitude term in this equation is $J_0(\alpha\rho)$, which is the zeroth-order Bessel function of the first type. The amplitude depends only the distance $\rho$ from the optic axis 6 and not on the position z on the optic axis 6, indicating that the beam does not spread. The parameter $\alpha$ is proportional to the beam diameter. The non-diffracting beam 18 is also referred to as a diffraction-free beam or Bessel beam.

The parameter $\beta$ is equal to $k\cos\theta$, where k is the wave number associated with light of wavelength $\lambda$. The phase of the non-diffracting beam 18 is given by the following equation.

$$E(z, t) = \exp[i(\omega t - kz\cos\theta)]$$

This phase equation is the same as for an ordinary plane wave, except that the phase velocity is $\omega/(k\cos\theta)$. The non-diffracting beam 18 thus approximates a plane wave with phase velocity $\omega/(k\cos\theta)$ that propagates without spreading.

As the non-diffracting beam 18 travels through the non-linear optical element 10, its wavelength is gradually converted from $\lambda$ to $\lambda/2$ by the well-known phenomenon of second-harmonic generation (SHG). The periodic domain inversion structure is provided to compensate for the loss of phase coherence resulting from the different speeds with which light of these different wavelengths $\lambda$ and $\lambda/2$ propagates in the non-linear optical element 10. This compensation is referred to as quasi-phase-matching (QPM), and the non-linear optical element 10 is commonly referred to as a QPM SHG element. In the present embodiment, SHG and QPM can be analyzed mathematically as follows.

The real part of the electric field of the non-diffracting beam 18 in the non-linear optical element 10 can be expressed in the following form, where E is an amplitude term that depends only on distance from the z-axis, and $k_f$ is the wave number of light with the fundamental wavelength $\lambda$ propagating parallel to the optic axis 6.

$$E(z, t) = E\cos(\omega t - k_f z\cos\theta)$$

The electric field of the second-harmonic light generated in the non-linear optical element 10 has the following expression, in which $\omega_{sh}$ and $k_{sh}$ represent, respectively, the angular frequency and wave number of light with the second-harmonic wavelength $\lambda/2$ propagating parallel to the optic axis 6, and $E_{sh}$ is the second-harmonic amplitude.

$$E_{sh}(z) = E_{sh}\cos(\omega_{sh} t - k_{sh} z)$$

The two wave numbers $k_f$ and $k_{sh}$ are given by the following equations, in which $n_f$ and $n_{sh}$ are the refractive indexes of the non-linear optical element 10 with respect to light of wavelengths $\lambda$ and $\lambda/2$, respectively, propagating parallel to the optic axis.

$$k_f = 2\pi n_f/\lambda$$

$$k_{sh} = 2\pi n_{sh}/(\lambda/2)$$

The electrical polarization P induced by an electrical field E is expressed by the following equation, in which $\chi_1$, $\chi_2$, $\chi_3$, . . . are the first-order, second-order, third-order, . . . electric susceptibilities.

$$P = \chi_1 E + \chi_2 EE + \chi_3 EEE + $$

The second-order non-linear polarization $P_{sh}$ can be written as follows.

$$P_{sh} = (½) \chi_2 E^2 \cos(\omega_{sh} t - 2k_f z)$$

The non-linear optical interaction can be analyzed by solving this second-order non-linear polarization for the frequency of interest ($\omega_{sh}$ in this case), as the driving component of the following wave equation.

$$\nabla \times \nabla \times E + \frac{\partial}{\partial t}(\mu_0 E) + \mu_0 \varepsilon \frac{\partial^2}{\partial t^2} E = -\mu_0 \frac{\partial^2}{\partial t^2} P$$

In this and the following equations, $\mu$ and $\varepsilon$ represent the magnetic permeability and dielectric constant, respectively, of the non-linear optical element, while $\mu_0$ and $\varepsilon_0$ represent the magnetic permeability and dielectric constant of the vacuum. For the second harmonic, the following equation is to be solved.

$$\nabla \times \nabla \times E_{sh}\cos(\omega_{sh}t - k_{sh}z) + \omega_{sh}^2 \varepsilon\mu - E_{sh}\cos(\omega_{sh}t - k_{sh}z) = -\omega_{sh}^2 \mu P_{sh}$$

If the interaction occurs collinearly and the conversion to the second harmonic takes place gradually, as is the case, then the equation above can be rewritten as follows.

$$\frac{dE_{sh}}{dz} = \frac{i\omega_{sh}}{2}\sqrt{\frac{\mu_0}{\varepsilon_{sh}}} \chi_2 E_f^2 \exp(-i\Delta k z)$$

The term $\Delta k$ represents the usual phase mismatch for light of the fundamental and second-harmonic wavelengths propagating parallel to the optic axis 6, which can be calculated as follows.

$$\Delta k = k_{sh} - 2k_f \cos\theta;$$
$$= (4\pi/\lambda)n_{sh} - 2(2\pi/\lambda)n_f \cos\theta$$
$$= (4\pi/\lambda)(n_{sh} - n_f \cos\theta)$$

The phase mismatch in the non-diffracting beam 18 is $\Delta k$, because the light from the axicon lens 14 is directed toward the optic axis 6 at an angle of $\theta$.

Over an interaction length l in which the loss of energy at the fundamental wavelength can be ignored, the second-harmonic output is expressed by the following equation, in which A represents the sectional area of the non-diffracting beam 18.

$$P_{sh} = 1/2(\varepsilon/\mu_0)^{1/2} E_{sh}^2 A$$
$$= 2(\varepsilon_0/\mu_0)^{3/2}\{(\omega^2 \chi_2^2 l^2)/(n_f^2 n_{sh})\}$$
$$\{P^2/A\}\{[\sin(\Delta k l/2)]/(\Delta k l/2)^2\}$$

$$\{P^2/A\}\{[\sin(\Delta k l/2)]/(\Delta k l/2)^2\}$$

For light of the fundamental and second-harmonic wavelengths $\lambda$ and $\lambda/2$ propagating parallel to the optic axis 6, the non-linear optical element 10 has a coherence length $l_C$ given by the following formula.

$$l_C = \pi/\Delta k = \pi/(k_{sh} - 2k_f \cos\theta) = (\lambda/4)/(n_{sh} - n_f \cos\theta)$$

In conventional QPM SHG, the repeating period $\Lambda$ of the domain inversion structure is $2l_C$, where $l_C$ is the above coherence length. In the present embodiment, however, because of the altered phase velocity of the non-diffracting beam 18, the repeating period $\Lambda$ is given by the following equation.

$$\Lambda = 2l_C = (\lambda/2)/(n_{sh} - n_1 \cos\theta)$$

This equation defines what is referred to as the QPM condition. Second-harmonic conversion will proceed throughout the thickness of the non-linear optical element 10 only if the repeating period $\Lambda$ and phase mismatch $\Delta k$ satisfy this equation.

Because of its small diameter and non-spreading nature, the non-diffracting beam 18 maintains a high intensity as it propagates through the full thickness of the non-linear optical element 10. Wavelength conversion is therefore highly efficient, provided the QPM condition is satisfied.

Since the non-linear optical element 10 transmits the non-diffracting beam 18 in an unconfined manner, meaning that the non-diffracting beam 18 does not propagate through a waveguide, precise positional alignment between the axicon lens 14 and non-linear optical element 10 is unnecessary. All that is necessary is for the non-linear optical element 10 to be placed on the optic axis 6 in the path of the non-diffracting beam 18. The non-diffracting beam 18 does not necessarily have to be incident normal to the surface of the non-linear optical element 10, or to the interfaces between domains 12. The angle of incidence can be adjusted to compensate for dimensional error in the repeating period $\Lambda$, to ensure that the QPM condition is satisfied at the desired wavelength $\lambda$.

Variations

Figure 2:
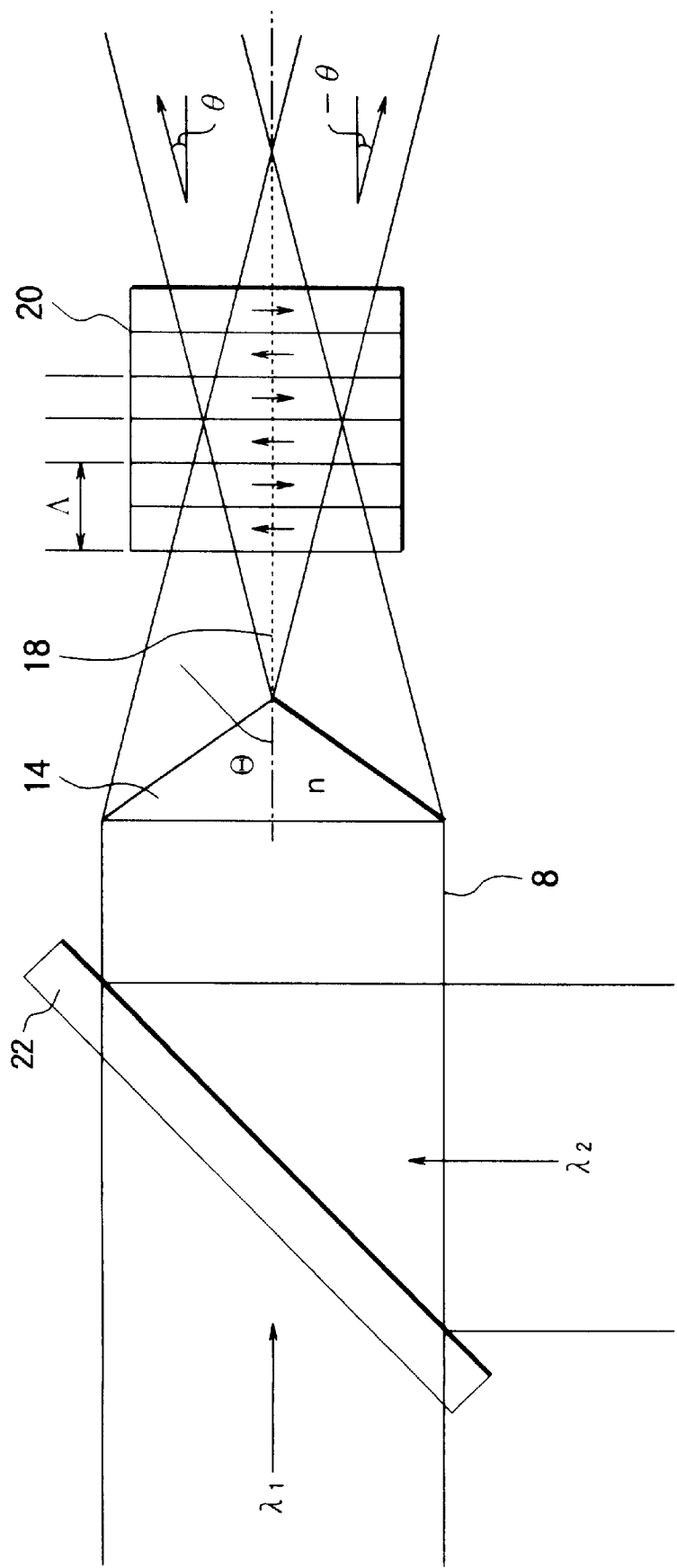
FIG. 2 illustrates the structure of a variation of the first embodiment.

FIG. 2 shows a variation of the first embodiment in which the non-linear optical element 20 has a periodic domain inversion structure adapted for sum-frequency generation (SFG). Coherent light of two different wavelengths $\lambda_1$ and $\lambda_2$ is combined by a half-mirror 22 and directed into the axicon lens 14. The axicon lens 14 forms the incident light into a non-diffracting beam 18 as described above. The non-linear optical element 20 converts the wavelengths in the non-diffracting beam 18 to a new wavelength equal to the reciprocal of the sum of the reciprocals of $\lambda_1$ and $\lambda_2$. That is, the frequency of the output light is the sum of the two frequencies of the input light.

The domain inversion structure of the non-linear optical element 20 is generally similar to that of the non-linear optical element 10 in the first embodiment. In the first embodiment, however, the phase mismatch $\Delta k$ for light propagating parallel to the optic axis 6 was $k_{sh} - 2k_f \cos\theta$, which can be written as follows.

$$\Delta k = k_{sh} - k_f \cos\theta - k_f \cos\theta$$

In sum-frequency generation, the phase mismatch $\Delta k_S$ is expressed as follows, where $k_{f1}$ is the wave number of light of the first fundamental wavelength $\lambda_1$, $k_{f2}$ is the wave number of light of the second fundamental wavelength $\lambda_2$, and $k_{sf}$ is the wave number of the sum-frequency light.

$$\Delta k_S = k_{sf} - k_{12}\cos\theta_2 - k_{11}\cos\theta_1,$$

where $\theta_1$ and $\theta_2$ are the angles at which geometric rays of light of the first ($\theta_1$) and second ($\theta_2$) fundamental wavelengths intersect the optic axis. The light of the first fundamental is described by the equation $$E_1(z,t) = \exp[i(\omega t - k_{f1} \cos \theta_1)]$$

and the light of the second fundamental wavelength is described by the equation $$E_2(z, t) = \exp[i(\omega t - k_{f2} \cos \theta_2)]$$

The QPM condition for SFG is given by the following equation.

$$\Lambda = 2(\pi/\Delta k_D)$$

The non-linear optical element 20 can also be adapted for difference-frequency generation (DFG). Again, light of two different wavelengths $\lambda_1$ and $\lambda_2$ is combined by a half-mirror 22 and formed into a non-diffracting beam 18. The phase mismatch $\Delta k_D$ is given by the following equation, in which $k_{f1}$ and $k_{f2}$ are as above, but $k_{df}$ now represents the wave number of the difference-frequency light.

$$k_D = k_{f1} \cos \theta_1 - k_{f2} \cos \theta_2 - k_{Df}$$

The QPM condition for DFG can be expressed by the following equation.

$$\Lambda = 2(\pi/\Delta k_D)$$

SFG or DFG wavelength conversion using a conventional device incorporating a waveguide requires extremely difficult positional alignment, as two laser beams must be coupled into the same waveguide. This is not the case in FIG. 2, however. Combining the light of wavelengths $\lambda_1$ and $\lambda_2$ by the half-mirror 22 presents no particular difficulties, and the non-linear optical element 20 only has to be placed in the path of the non-diffracting beam 18. As in the first embodiment, wavelength conversion is performed with high efficiency because the non-diffracting beam 18 maintains a small diameter and high intensity throughout the thickness of the non-linear optical element 20.

Second Embodiment

Figure 3:
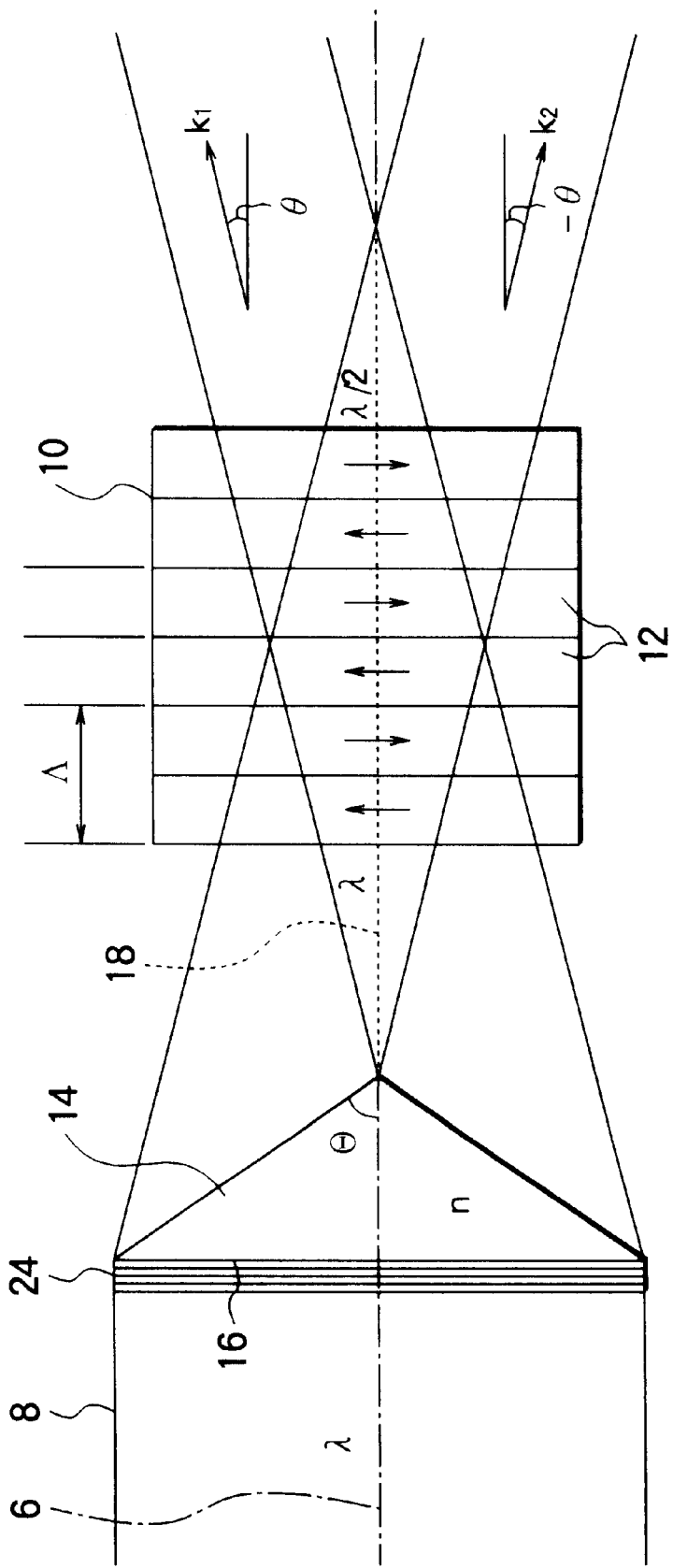
FIG. 3 illustrates the structure of a second embodiment.

FIG. 3 shows a second embodiment of the invention, which adds a multilayer coating 24 to the flat surface 16 of the axicon lens 14 of the first embodiment. The non-linear optical element 10 has the same periodic structure as in the first embodiment, with the same thin-film domains 12 and the same QPM condition.

The multilayer coating 24 partially reflects light of the wavelength $\lambda$ that satisfies the QPM condition of the non-linear optical element 10, and transmits other wavelengths without reflection. The multilayer coating 24 accordingly satisfies the Bragg condition with respect to wavelength $\lambda$. The reflected light is returned to the semiconductor laser (not visible) that provides the incident coherent light 8.

By feeding light of wavelength $\lambda$ back to the semiconductor laser, the multilayer coating 24 can stabilize the lasing wavelength, which would otherwise tend to vary with changes in ambient temperature and drive current. Holding the lasing wavelength to the value A that satisfies the QPM condition ensures that wavelength conversion will proceed with high efficiency, despite temperature and current variations.

The same stabilizing effect can be achieved by providing, instead of the multilayer coating 24, a partial reflecting means at any appropriate point on the optical path between the axicon lens 14 and the semiconductor laser. A diffraction grating satisfying the Bragg condition with respect to wavelength A can be employed, for example. For the SFG and DFG variations illustrated in FIG. 2, separate partial reflecting means can be provided for the two input wavelengths $\lambda_1$ and $\lambda_2$.

In conventional wavelength conversion devices of the waveguide type, a reflective coating or grating is sometimes provided at or near the output end of the non-linear optical element. In the present invention that would not be a favorable location, as much of the reflected light would miss the axicon lens 14 on the return trip.

Third Embodiment

Figure 4:
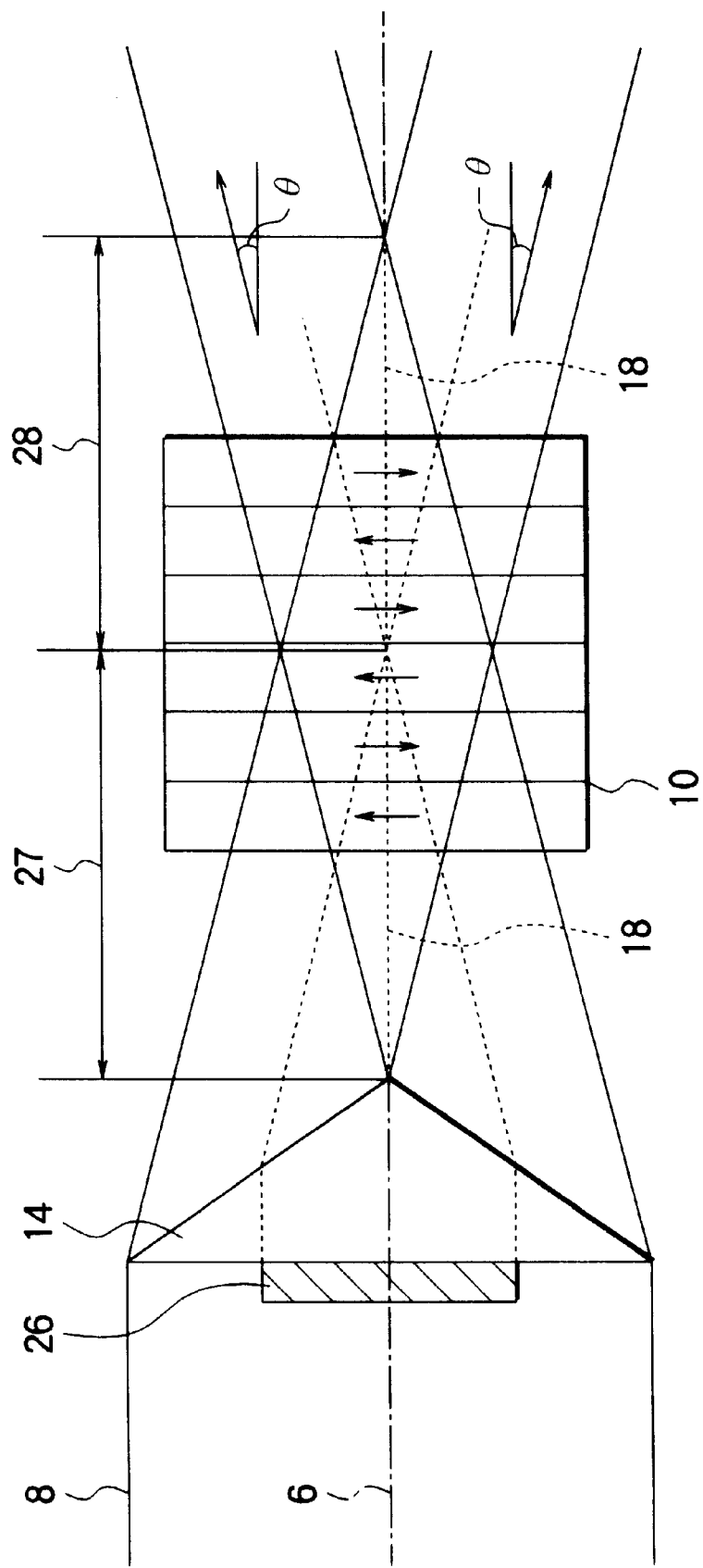
FIG. 4 illustrates the structure of a third embodiment.

The third embodiment, shown in FIG. 4, covers part of the flat surface 16 of the axicon lens 14 with a phase shifter 26. The purpose of the phase shifter 26 is to increase the QPM error tolerance. Other components of the third embodiment are as described in the first embodiment, and have the same reference numerals as in FIG. 1.

Figure 5:
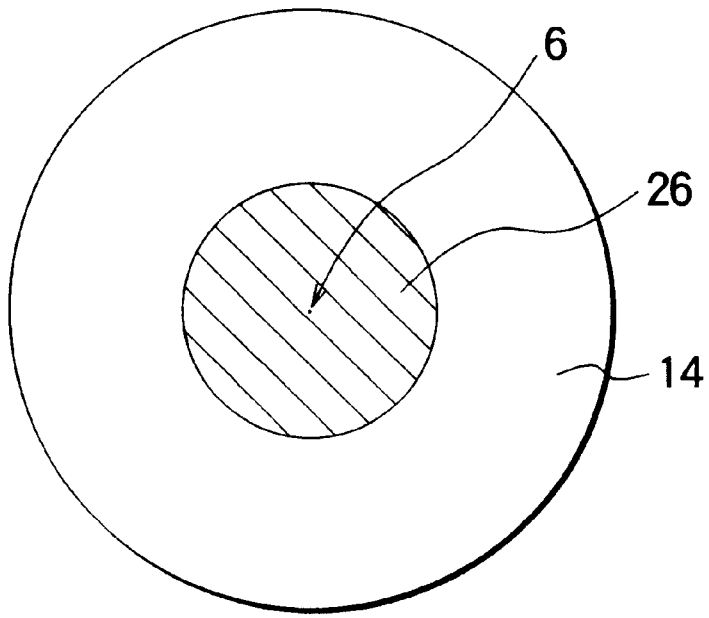
FIG. 5 illustrates the shape of the phase shifter in the third embodiment.

The phase shifter 26 is formed as a thin film covering an area symmetrical about the optic axis 6. Referring to FIG. 5, which shows the axicon lens 14 end-on, the phase shifter 26 has the shape of a disc centered on the optic axis 6. Light passing through the central part of the axicon lens 14, hence through the phase shifter 26, is delayed in phase with respect to light passing through the uncovered outer part of the axicon lens 14.

Referring again to FIG. 4, the non-diffracting beam 18 can be divided into two regions: a first region 27 illuminated by light that has passed through the phase shifter 26, and a second region 28 illuminated by light that has not passed through the phase shifter 26.

As explained in the first embodiment, the period A of the domain inversion structure in the non-linear optical element 10 has a nominal value of $2(\pi/\Delta k)$, where $\Delta k$ is the phase mismatch. The phase mismatch, however, varies with temperature, because the refractive indexes of the non-linear optical element 10 vary with temperature. For this and other reasons, such as manufacturing tolerances, $\Lambda$ will generally depart from its nominal value by a certain amount $\Delta \tau$, as in the following equation.

$$\Lambda = 2(\pi/\Delta k) + \Delta \tau$$

This error $\Delta \tau$ results in imperfect compensation for phase mismatch, so that as light propagates through the non-linear optical element 10, the phase mismatch gradually accumulates, and wavelength conversion efficiency declines. The useful thickness L of the non-linear optical element 10 in the first embodiment is limited to the range in which the cumulative phase mismatch does not exceed the coherence length $l_C$. The cumulative phase mismatch over a distance L is $(L/\Lambda)\Delta\tau$, so the useful thickness L of the non-linear optical element 10 is limited by the following inequalities.

$$(L/\Lambda)\Delta\tau < (\lambda/4)/[n_{sh} - n\cos\theta]$$

or $$L < (\lambda/4)(\Lambda/\Delta\tau)/[n_{sh} - n\cos\theta]$$

In the third embodiment, the useful thickness L of the non-linear optical element 10 in each of the two regions 27 and 28 is limited by these inequalities. The thickness and refractive index of the phase shifter 26 can be chosen, however, so that the phase lag between the first and second regions 27 and 28 compensates for the phase mismatch that has accumulated in the first region 27.

As explained in the first embodiment, the phase of the non-diffracting beam 18 in the second region 28, which is not affected by the phase shifter 26, can be expressed as follows.

$$\exp[i(\omega t - kz\cos\theta)]$$

The phase of the non-diffracting beam 18 in the first region is expressed as follows, where $\delta$ is the phase lag caused by the phase shifter 26.

$$\exp[i(\omega t - kz\cos\theta\, z - \delta)]$$

If the phase mismatch that accumulates as the non-diffracting beam 18 travels through the part of the non-linear optical element 10 disposed in the first region 27 is equal in magnitude to $\delta$, then the second-harmonic light generated in the first region 27 will match the phase of the fundamental light reaching the second region 28 closely enough for second-harmonic generation to continue efficiently in the second region 28.

For a given dimensional tolerance $\Delta\tau$ of the period $\Lambda$ of the domain inversion structure in the non-linear optical element 10, the phase shifter 26 enables the thickness of the non-linear optical element 10 to be roughly doubled, so that more of the incident light can be converted. Conversely, for a given thickness of the non-linear optical element 10, the phase shifter 26 allows the tolerance $\Delta\tau$ to be relaxed. Furthermore, for a given non-linear optical element 10, the phase shifter 26 increases the range of wavelengths $\lambda$ that will be converted efficiently in at least a certain fraction of the thickness of the non-linear optical element 10, thereby providing an additional operating margin with respect to wavelength variations, temperature variations, and other ambient conditions.

Similar effects of greater useful thickness, relaxed manufacturing tolerances, and wider operating margins with regard to ambient conditions can be obtained by providing a similar phase shifter in a wavelength conversion device employing SFG or DFG, as shown in FIG. 2.

Figure 6:
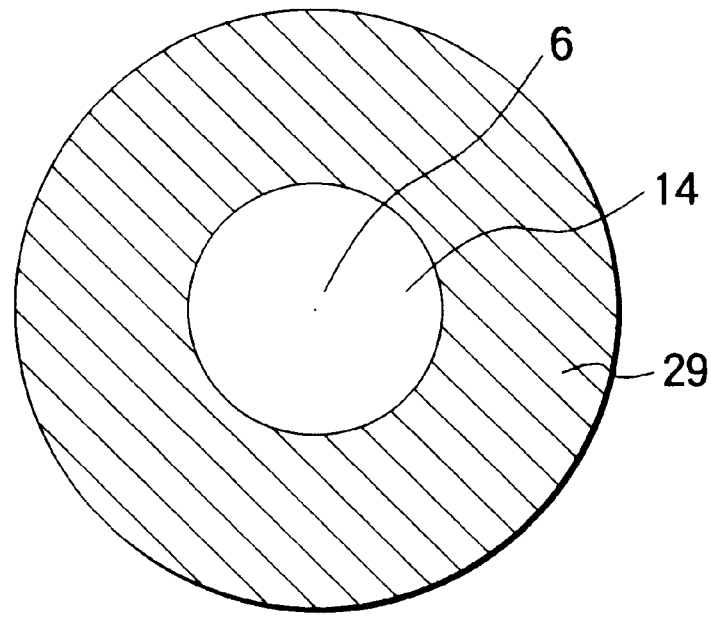
FIG. 6 illustrates an alternative shape of the phase shifter in the third embodiment.

The phase shifter need not be a central disc. Referring to FIG. 6, a phase shifter 29 can be formed as an annular film covering the outer half of the face of the axicon lens 14. The same type of phase lag is then obtained, but with opposite sign. Whether the phase shifter 26 in FIG. 5 or the phase shifter 29 in FIG. 6 is advantageous depends on the algebraic sign of the dimensional error $\Delta\tau$ of the period $\Lambda$.

In the preceding embodiments the length of the non-diffracting beam 18 exceeded the thickness of the non-linear optical element 10, so only part of the energy in the non-diffracting beam was available for wavelength conversion. Conversion efficiency would be increased if the non-diffracting beam were shortened to eliminate this waste of energy. Conversion efficiency would decrease if the beam were shorter than the thickness of the non-linear optical element 10, however; in that case part of the wavelength-converting capability of the non-linear optical element 10 would be wasted. For maximum conversion efficiency, the length of the non-diffracting beam 18 should exactly match the thickness of the non-linear optical element 10.

One method of shortening the non-diffracting beam to match the thickness of the non-linear optical element 10 would be to increase the angle $\theta$ in FIGS. 1 to 4. The relationships $\alpha^2 + \beta^2 = (\omega/c)^2$ and $\beta = k\cos\theta$ imply, however, that as the angle $\theta$ is increased, the beam diameter (proportional to $\alpha$) also increases; hence the beam intensity is reduced, and conversion efficiency lowered.

For maximum conversion efficiency, not only should the beam length be optimized, but the beam intensity should also be maximized, hence the angle $\theta$ should be minimized. The next five embodiments will be directed toward maximizing the beam intensity by reducing the angle $\theta$, while matching the beam length to the thickness of the non-linear optical element 10.

Figure 7:
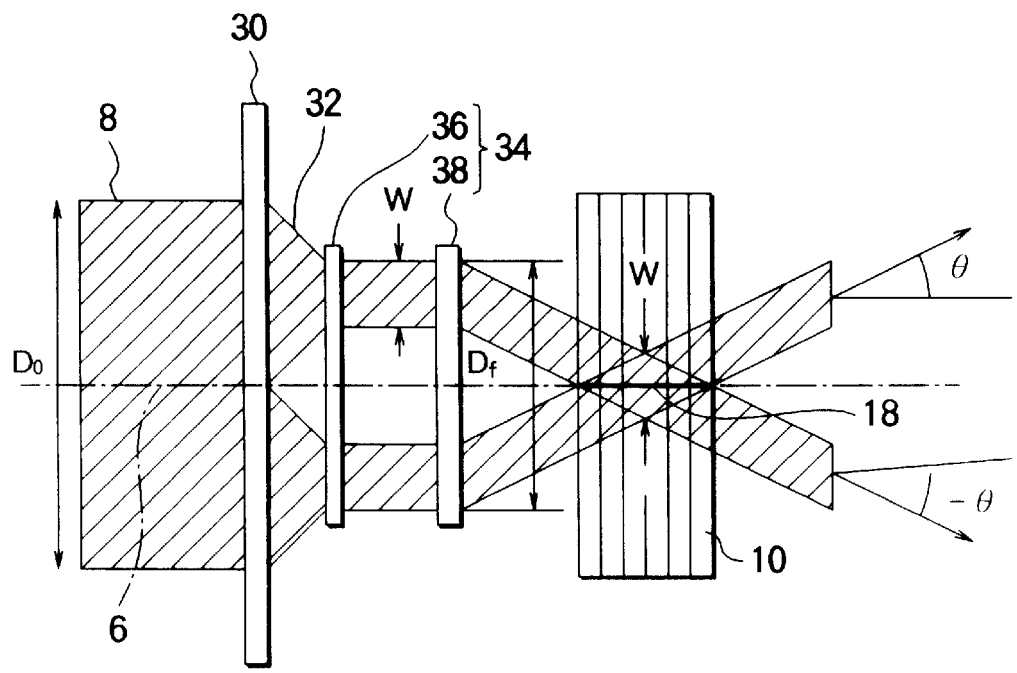
FIG. 7 illustrates the general scheme of the fourth to eighth embodiments.

FIG. 7 shows the general scheme employed in these embodiments. The incident coherent light 8 and non-linear optical element 10 are the same as in the preceding embodiments. The non-diffracting beam generator now comprises a first optical system 30, which produces an annular image 32, and a second optical system 34, which generates a non-diffracting beam 18 from the annular image 32. The second optical system 34 consists of a tubular beam collimator 36 and an axicon optical element 38, which may be separate, as shown, or may be combined into a single optical element.

The angle $\theta$ can be reduced by reducing the diameter $D_f$ of the annular image 32. The length L of the non-diffracting beam 18 is controlled by the width W of the annular image 32 and the cotangent of the angle $\theta$ according to the following relation.

$$L = W\cot\theta$$

If $\theta$ is small, then $\cot\theta$ will be large, so to obtain the desired beam length L, the width W must also be small. The desired non-diffracting beam is accordingly obtained by forming a small, thin annular image 32 and directing the light from this annular image 32 toward the optic axis 6 at a narrow angle $\theta$.

Fourth Embodiment

Figure 8:
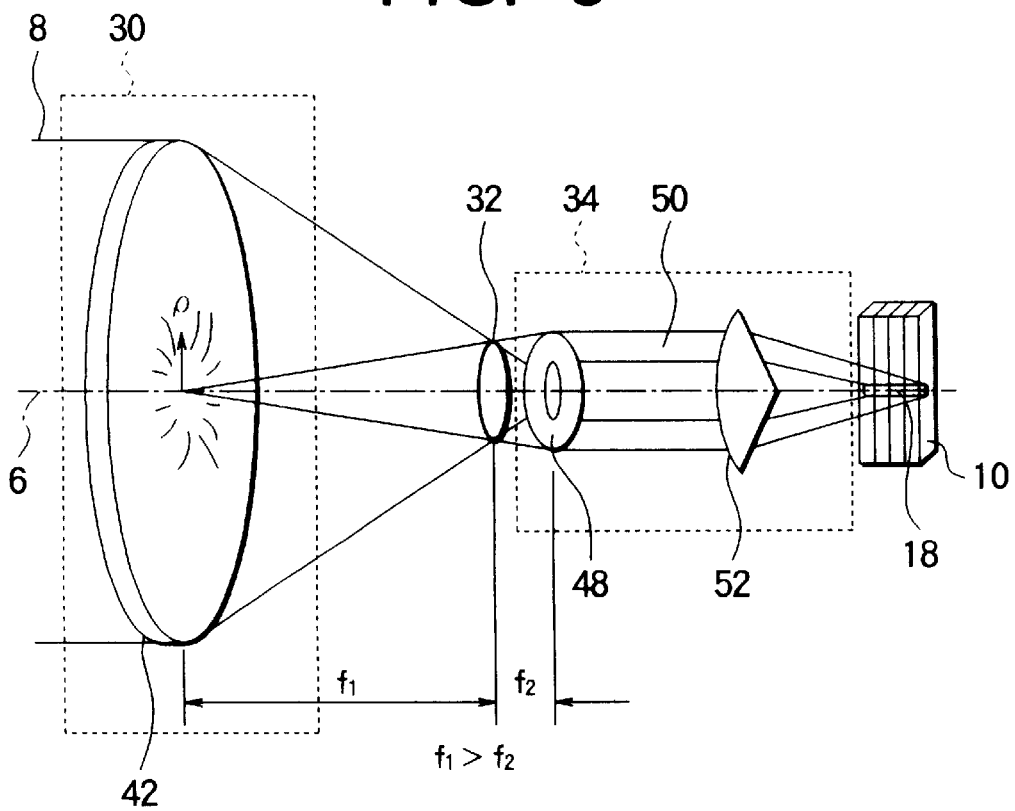
FIG. 8 illustrates the structure of the fourth embodiment.

Referring to FIG. 8, in the fourth embodiment the first optical system 30 comprises a disc-shaped toroidal lens 42 for focusing the coherent light 8 to an annular image 32. The second optical system 34 comprises a ring-shaped toroidal lens 48 that collimates the light from the annular image 32 to form a tubular parallel beam 50, and an axicon lens 52 that directs this tubular parallel beam 50 toward the optic axis 6, creating a non-diffracting beam 18 with a length matching the thickness of the non-linear optical element 10. FIG. 8 shows these elements in a perspective view.

A toroid is defined as a solid of revolution obtained by rotating an arbitrary plane figure about an axis (in this case the optic axis 6) disposed in the plane of the figure. For both toroidal lenses 42 and 48 in this embodiment, the plane figure is that of an ordinary convex lens seen in cross-section. For the disc-shaped toroidal lens 42, the axis of rotation passes through the convex-lens section at an off-center interior point. For the ring-shaped toroidal lens 48, the axis of rotation is exterior to the convex-lens section.

Figure 9:
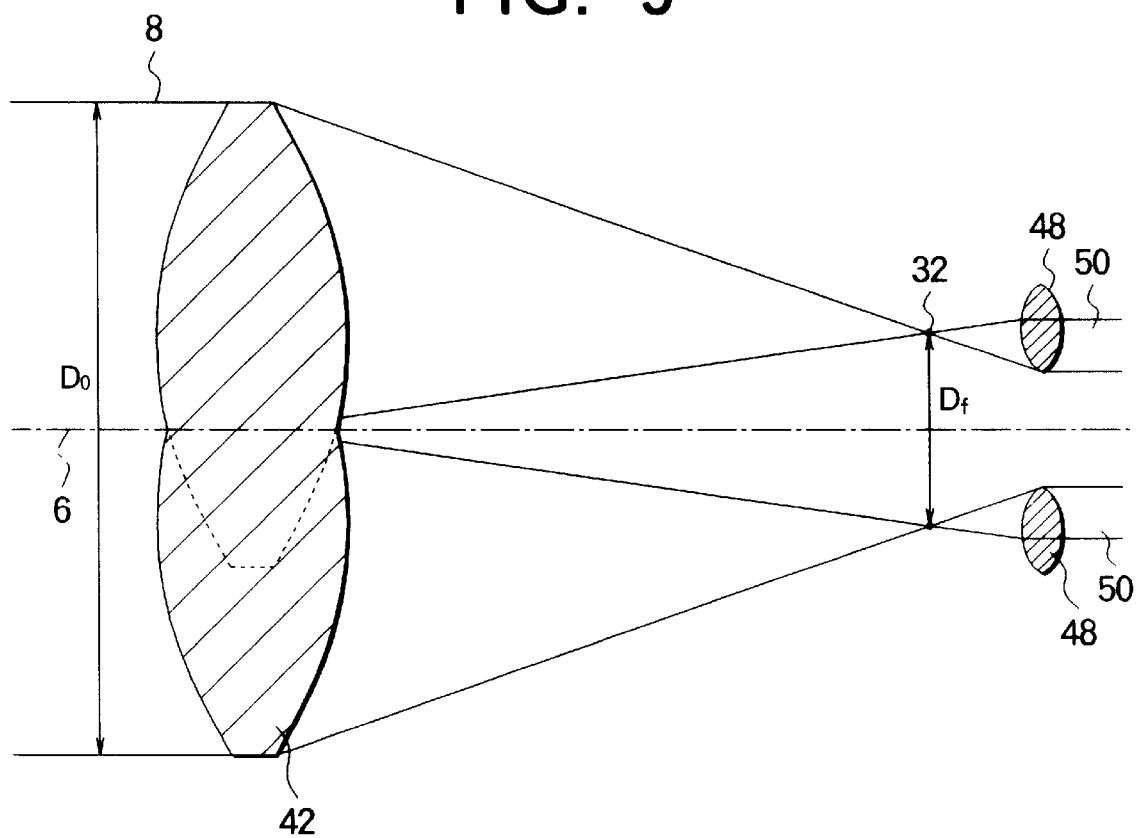
FIG. 9 illustrates the shape of the toroidal lenses in the fourth embodiment.

FIG. 9 shows an enlarged sectional view of the toroidal lenses 42 and 48. The convex plane figure that was rotated to obtain the disc-shaped toroidal lens 42 is enclosed by a solid line above the optic axis 6 and a dotted line below the optic axis 6. The thickness of the disc-shaped toroidal lens 42, measured parallel to the optic axis 6, first increases, then decreases, with increasing distance from the optic axis 6, and the thickness in the center, on the optic axis 6, is greater than the thickness at the outer edge. The diameter $D_f$ of the annular image 32 is consequently less than half the effective aperture $D_0$ of the disc-shaped toroidal lens 42.

$$D_f < D_0/2$$

The ring-shaped toroidal lens 48 has a cross-sectional shape resembling that of two identical convex lenses with centers separated by $D_f$. The focal length of these lenses is preferably short, so that the ring-shaped toroidal lens 48 can be placed close to the annular image 32 and a thin-walled tubular beam 50 created.

Referring again to FIG. 8, the toroidal lenses 42 and 48 are disposed so that they have mutually common focal points on the annular image 32. The tubular beam 50 is therefore parallel. In the drawing, $f_1$ denotes the focal length of the disc-shaped toroidal lens 42, and $f_2$ denotes the focal length of the ring-shaped toroidal lens 48. The relation $f_1 > f_2$ implies that the outer diameter of the tubular parallel beam 50 is less than the effective aperture of the disc-shaped toroidal lens 42.

As shown in FIG. 8, the fourth embodiment enables all of the energy of the non-diffracting beam 18 to be concentrated into the non-linear optical element 10. The small diameter $D_f$ of the annular image 32 and short focal length $f_2$ of the ring-shaped toroidal lens 48 moreover permit the non-diffracting beam to have an extremely small diameter, and a correspondingly high intensity, leading to improved wavelength conversion efficiency. This is because the tubular beam is refracted toward the optic axis 6 by the axicon lens 52 at small angle (the angle θ in FIG. 7), as discussed earlier.

Fifth Embodiment

Figure 10:
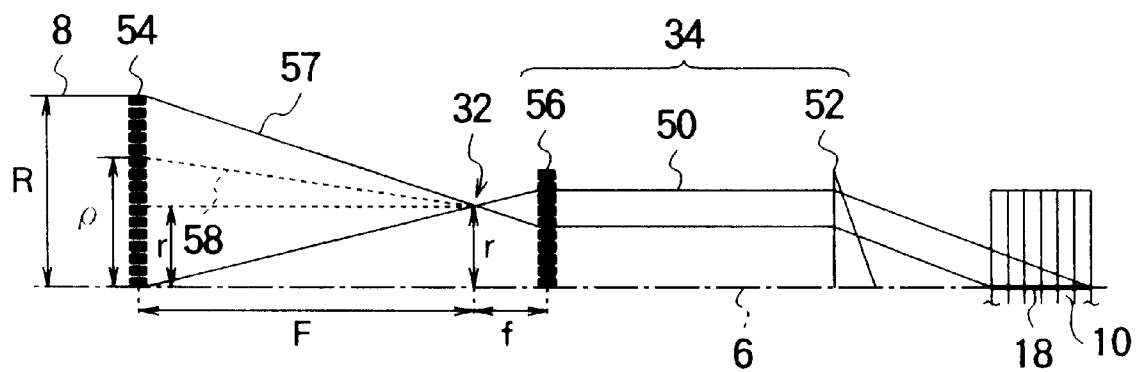
FIG. 10 illustrates the structure of the fifth embodiment.

FIG. 10 is a sectional view of a fifth embodiment, showing only the part above the optic axis 6. The fifth embodiment replaces the toroidal lenses of the fourth embodiment with zone plates having equivalent functions.

The first optical system of the fifth embodiment comprises a first zone plate 54. The second optical system 34 comprises a second zone plate 56 and the same axicon lens 52 as in the fourth embodiment.

The phase transmission function $t(\rho)$ of the first zone plate 54 is given by the following equation, in which k is the wave number of light with the fundamental wavelength λ (k=2π/λ), ρ represents distance from the optic axis 6, $\phi_1(\rho)$ is the phase distribution function of the zone plate 54, and $\varphi_1(\rho)$ is the corresponding phase difference function.

$$t(\rho) = \exp[i\phi_1(\rho)] = \exp[ik\varphi_1(\rho)]$$

The functions $\phi_1(\rho)$ and $\varphi_1(\rho)$ are related as follows.

$$\phi_1(\rho) = (2\pi/\lambda)\varphi_1(\rho)$$

The function $\varphi_1(\rho)$ describes the difference in optical path length from two points on the zone plate 54, disposed at distances R and ρ from the optic axis 6, to a point on the annular image 32, which is at a distance r from the optic axis 6. That is, $\varphi_1(\rho)$ describes the difference in length between the two paths 57 and 58 in FIG. 10. The symbol R represents the effective radius of the first zone plate 54, and the symbol r is the radius of the annular image 32 ($D_f/2$ in FIG. 9). If F is the distance from the zone plate 54 to the plane of the annular image 32, then $\varphi_1(\rho)$ is given by the following equation.

$$\varphi_1(\rho) = [(R-r)^2 + F^2]^{1/2} - [(\rho-r)^2 + F^2]^{1/2}$$

If F is much larger than (R −r) and (ρ−r), which will generally be true, then $\varphi_1(\rho)$ can be closely approximated as follows.

$$\varphi_1(\rho) = [R^2 - \rho^2 - 2r(R-\rho)]/(2F)$$

This yields the following approximate expression for the phase distribution function $\phi_1(\rho)$.

$$\phi_1(\rho) = [\pi/(\lambda F)][R^2 - \rho^2 - 2r(R-\rho)]$$

The phase distribution function $\phi_2(\rho)$ of the second zone plate 56 can be obtained by substituting f for F in this equation, where f is the distance from the annular image 32 to the second zone plate 56. $\phi_2(\rho)$ can therefore be computed as follows.

$$\phi_2(\rho) = (F/f)\phi_1(\rho)$$

Zone plates with these phase distribution functions $\phi_1(\rho)$ and $\phi_2(\rho)$ can be created by well-known methods of digital holography, also referred to as computer-generated holography (CGH). The first zone plate 54 focuses the incident coherent light 8 to an annular image 32 at the above distance F. The second zone plate 56 collimates the light from the annular image 32 to form a tubular parallel beam 50, from which the axicon lens 52 creates a non-diffracting beam 18. The parameters f and r can be selected to give the non-diffracting beam 18 the desired length and diameter.

The width of the zones in both zone plates 54 and 56 will be greatest at a distance r from the optic axis 6. The region of maximum zone width should be closer to the center of the first zone plate 54 than to its outer edge. The necessary condition for this is:

$$r < R/2$$

The fifth embodiment offers the same advantages of increased wavelength conversion efficiency as the fourth embodiment, with the additional advantage that zone plates are easier to fabricate than are toroidal lenses, and zone plates can, in principle, be made free of spherical aberration.

Variation

Figure 11:
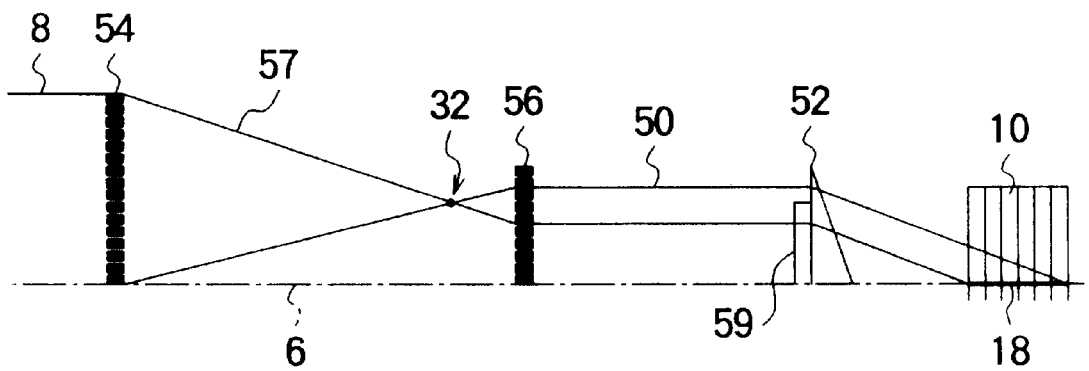
FIG. 11 illustrates a variation of the fifth embodiment.

FIG. 11 illustrates a variation of the fifth embodiment, using the same reference numerals as in FIG. 10 to denote identical elements.

This variation covers part of the flat surface of the axicon lens 52 with a phase shifter 59 similar to the phase shifter 26 of the third embodiment. The phase shifter 59 is positioned to provide a phase delay in the inner half of the tubular parallel beam 50. As in the third embodiment, this phase shift increases the QPM error tolerance, thereby enabling the thickness of the non-linear optical element 10 to be increased, and providing additional operating margins with regard ambient conditions.

The phase shifter 59 in FIG. 10 has the shape of a disc centered on the optic axis 6. The phase shifter could have an annular shape, however, covering either the inner or the outer half of the tubular parallel beam 50.

A similar phase shifter could be added to the axicon lens 48 in the fourth embodiment.

Instead of adding a phase shifter 59 to the axicon lens 48 in the fifth embodiment, an equivalent phase-shifting function could be incorporated into the second zone plate 56, as described later.

Sixth Embodiment

Figure 12:
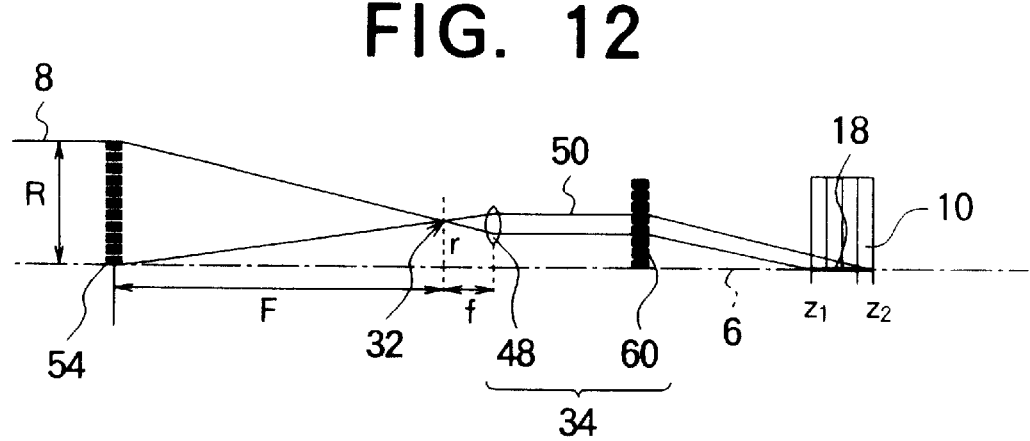
FIG. 12 illustrates the structure of the sixth embodiment.

FIG. 12 is a sectional view of a sixth embodiment, again showing only the part above the optic axis 6. The sixth embodiment employs the first zone plate 54 of the fifth embodiment, the ring-shaped toroidal lens 48 of the fourth embodiment, and a third zone plate 60 in place of the axicon lens of the fourth and fifth embodiments.

Figure 13:
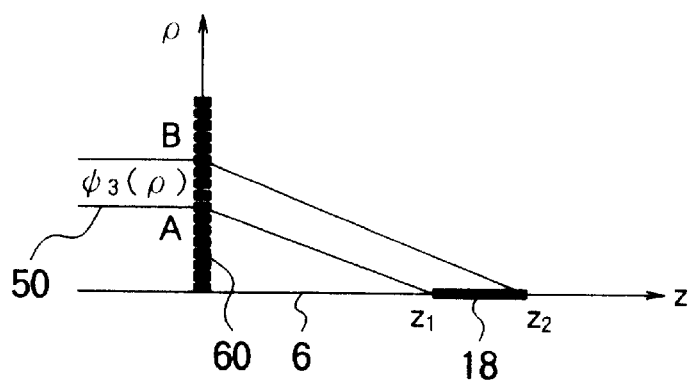
FIG. 13 illustrates parameters related to a zone plate in the sixth embodiment.

FIG. 13 shows an enlarged view of the third zone plate 60 and non-diffracting beam 18, omitting the non-linear optical element for clarity. A coordinate system is shown in which the z-axis is the optic axis 6 and the ρ-axis is a vertical axis through the plane of the third zone plate 60. The origin of this coordinate system is at the center of the zone plate 60. The letters A and B denote the distances of the inner and outer edges of the tubular parallel beam 50 from the optic axis 6. The phase distribution function of the third zone plate 60, denoted $\phi_3(\rho)$, will be derived below.

It is useful to start from the phase distribution function $\phi(\rho)$ and phase difference function $\phi(\rho)$ of an ordinary spherical lens having a focal length f for light of wavelength λ. If referenced to the phase of an axial ray, these functions are given in the following equations.

$$\begin{aligned}\phi(\rho) &= (2\pi/\lambda)\phi(\rho)\\ &= (2\pi/\lambda)[(\rho^2 + f^2)^{1/2} - f]\\ &= (2\pi/\lambda)f[1 + (\rho/f)^2/2 - 1] \quad \text{(approximately)}\\ &= (2\pi/\lambda)\rho^2/(2f) \quad \text{(approximately)}\end{aligned}$$

A lens of this type focuses 84% of the total incident energy onto an Airy disc of $r_D$, given by the following equation, in which where R is the radius of the lens.

$$r_D = 2.44\lambda f/(2R)$$

The depth of focus d of this lens is given by the following equation.

$$d = \lambda(f/2R)^2$$

The third zone plate 60 must focus light incident at distance A from the optic axis to a point $z_1$ on the optic axis, and light incident at distance B from the optic axis to a point $z_2$. The focal length must therefore vary as a function of the distance ρ from the optic axis. The phase distribution function $\phi_3(\rho)$ of the zone plate 60 is accordingly expressed as follows, where f(ρ) is the focal length of the zone plate 60 with respect to rays incident parallel to and at a distance β from the optic axis 6.

$$\phi_3(\rho) = (2\pi/\lambda)\rho^2/[2f(\rho)]$$

For an axicon lens, f(ρ) = ρcot θ, where θ is the angle shown in FIGS. 1–4. If this function f(ρ) is applied to the zone plate 60, and if a = cot θ, the following equation is obtained for $\phi_3(\rho)$.

$$\phi_3(\rho) = (2\pi/\lambda)\rho/(2a)$$

The focal depth is aR, meaning that a beam can be formed in the range 0<z<aR. The ratio of peak beam intensity to total beam energy, however, is a λ/R, and the half power width of the beam is aλ, so the beam does not have the desired small diameter or constant high intensity.

A more general form of f(ρ) is given by the following equation, in which $f_0$, a, and b are arbitrary constants.

$$f(\rho) = f_0 + a\rho^b$$

The focal range of a zone plate employing this function is $f_0 < z < f_0 + aR^b$, and the focal depth is $aR^b$. The parameter b determines the intensity distribution along the z-axis.

If the tubular parallel beam 50 has a uniform intensity $P_0$, then the energy incident on an annular region of width dρ located at a distance ρ from the optic axis 6 is $2\pi P_0 \rho d\chi$. If the non-diffracting beam 18 is to have a uniform intensity $P_z$ on the z-axis, then the energy focused from this annular region to a segment of length dz on the optic axis 6 is $P_z dz$. By the law of conservation of energy, these two energies are equal, so the following relation holds.

$$P_z dz = 2\pi P_0 \rho d\rho$$

If the parameter a satisfies $P_O = (a/\pi)P_z$, this relation can be rewritten as follows.

$$dz = 2a\rho d\rho$$

In terms of the function f(ρ), this relation becomes the following differential equation.

$$df(\rho) = 2a\rho d\rho$$

From FIG. 13, $f(A) = z_1$ and $f(B) = z_2$. Integration of the above differential equation between these boundary points gives the following formula for f(ρ), indicating that a uniform intensity is obtained if the above-mentioned parameter b is equal to two.

$$\begin{aligned}f(\rho) &= (z_1 - z_2)\rho^2/(A^2 - B^2) + (z_2 A^2 - z_1 B^2)/(A^2 - B^2)\\ &= [(z_1 - z_2)\rho^2 + (z_2 A^2 - z_1 B^2)]/(A^2 - B^2)\end{aligned}$$

The desired phase distribution function $\phi_3(\rho)$ is accordingly the following.

$$\begin{aligned}\phi_3(\rho) &= (\pi/\lambda)(\rho^2/f(\rho))\\ &= (\pi/\lambda)\rho^2(A^2 - B^2)/[(z_1 - z_2)\rho^2 + (z_2 A^2 - z_1 B^2)]\end{aligned}$$

From FIG. 12, B = (F+f)r/F and A = B−Rf/F, where R represents the effective radius of the first zone plate 54, F is the focal length of this zone plate 54, f is the focal length of the ring-shaped toroidal lens 48, and r is the radius of the annular image 32. These equations can be used to fabricate, as a computer-generated hologram for example, a third zone plate 60 that will generate a non-diffracting beam 18 of uniform intensity between points $z_1$, and $z_2$ on the optic axis. The values of $z_1$ and $z_2$ should be chosen so that $z_2 - z_1$ equals the thickness of the non-linear optical element 10.

Seventh Embodiment

Figure 14:
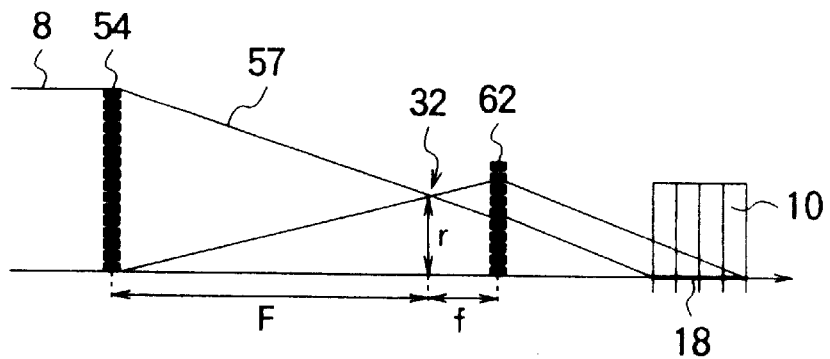
FIG. 14 illustrates the structure of the seventh and eighth embodiments.

FIG. 14 is a sectional view of a seventh embodiment, again showing only the part above the optic axis 6. The seventh embodiment uses the same first zone plate 54 as in the fifth and sixth embodiments, but replaces the second optical systems 34 of those embodiments with a single zone plate 62 that combines the functions of the second and third zone plates 56 and 60. This replacement is possible because of the phase-preserving nature of the tubular parallel beam 50 in FIGS. 10 and 12.

The phase distribution function $\phi_4(\rho)$ of the single zone plate 62 can be obtained by adding the phase distribution functions $\phi_2(\rho)$ and $\phi_3(\rho)$ derived above for the second and third zone plates 56 and 60, as follows.

$$\phi_4(\rho) = \phi_2(\rho) + \phi_3(\rho)$$

The seventh embodiment combines the advantages of the fourth, fifth, and sixth embodiments with the further advantage of an extremely simple structure, consisting of only two zone plates 54 and 62 and the non-linear optical element 10. This simple structure reduces the cost and enhances the long-term reliability of the wavelength conversion device, and since no lenses are used, the wavelength conversion device is, in principle, free of spherical aberration.

Eighth Embodiment

The eighth embodiment has the same structure as the seventh embodiment, illustrated in FIG. 14, but employs a different phase distribution function for the single zone plate 62. Specifically, the eighth embodiment combines the features of the third and seventh embodiments by adding a phase-shifting function to this single zone plate 62.

The phase distribution function $\phi_5(\rho)$ of the single zone plate 62 in the eighth embodiment is given by the following equation, in which $\phi_2(\rho)$ and $\phi_3(\rho)$ are as above and $\phi_6(\rho)$ represents the phase distribution function of a phase shifter.

$$\phi_5(\rho) = \phi_2(\rho) + \phi_3(\rho) + \phi_6(\rho)$$

For a phase shifter of the type shown in FIG. 5, $\phi_6(\rho)$ can be defined as follows, where A and B are as indicated in FIG. 13, S is a value between A and B, and $\delta$ is the desired phase shift. The phase shift $\delta$ may be either positive or negative.

$$\phi_6(\rho) = (2\pi/\lambda)\delta \quad \text{(if } A < \rho < S\text{)}$$
$$= 0 \quad \text{(if } S < \rho < B\text{)}$$

For a phase shifter of the type shown in FIG. 6, $\phi_6(\rho)$ can be defined as follows.

$$\phi_6(\rho) = 0 \quad \text{(if } A < \rho < S\text{)}$$
$$= (2\pi/\lambda)\delta \quad \text{(if } B < \rho < B\text{)}$$

Besides matching the length of the non-diffracting beam 18 to the thickness of the non-linear optical element 10, the eighth embodiment permits that thickness to be increased, for reasons explained in the third embodiment, so that wavelength conversion efficiency can be further improved. The QPM error tolerance is also increased.

A similar phase-shifting feature can be added to the second zone plate 56 in the fifth embodiment, or to the third zone plate 60 in the sixth embodiment, by adding either of the functions $\phi_6(\rho)$ defined above to the phase distribution functions for those zone plates.

Ninth Embodiment

When the length of the non-diffracting beam 18 matches the thickness of the non-linear optical element 10, light of the converted wavelength emerges from the non-linear optical element 10 in the form of a divergent tubular conical beam. Many applications, however, require a small spot of light. Even more useful, in some applications, would be a parallel beam of small diameter, which could produce a small spot at an arbitrary distance from the wavelength conversion device.

Figure 15:
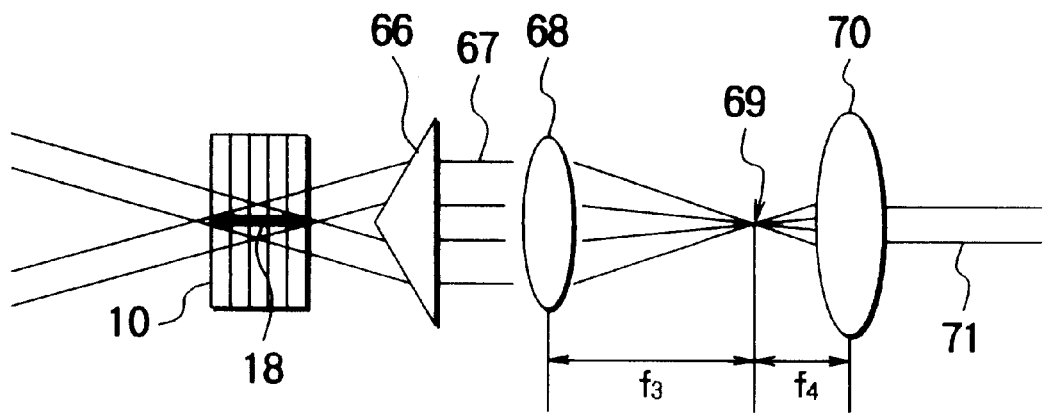
FIG. 15 illustrates part of the structure of a ninth embodiment.

Referring to FIG. 15, this type of beam can be produced by adding an axicon collimating lens 66 that parallelizes the divergent tubular beam of wavelength-converted light to create a tubular parallel beam 67, a first convex lens 68 to focus this tubular parallel beam 67 to a super-resolved spot 69, and a second convex lens 70 to collimate light from the super-resolved spot 69 into a parallel output beam 71. If the diameter of the parallel output beam 71 is sufficiently small, this beam 71 will not be tubular, but will have a substantially constant intensity over its entire cross-section, because of diffraction effects.

If the focal length of the first convex lens 68 is $f_3$, an ordinary parallel beam of light of wavelength $\lambda/2$ having a diameter D would be focused to a spot with a radius of $2.44(\lambda/2)f_3/D$. More precisely, this is the radius of the central Airy disc of the spot, as described above. A tubular beam of the same diameter D, however, is focused to a smaller spot, by the well-known phenomenon of super-resolution. If the second convex lens 70 has a sufficiently small focal length $f_4$, the super-resolved spot 69 can be collimated to a parallel beam 71 of extremely small diameter.

The diameter of the final beam 71 depends on the ratio $f_4/f_3$, so it is advantageous for $f_4$ to be small and $f_3$ to be large. The beam diameter also depends, however, on the size of the spot 69, which must be kept small. Super-resolution permits a small spot 69 to be obtained despite a comparatively large value of $f_3$.

If a spot rather than a beam of output light is required, the second convex lens 70 can be omitted.

The non-diffracting beam 18 in the third embodiment can be generated by any of the non-diffracting beam generators shown in the preceding embodiments.

Tenth Embodiment

Figure 16:
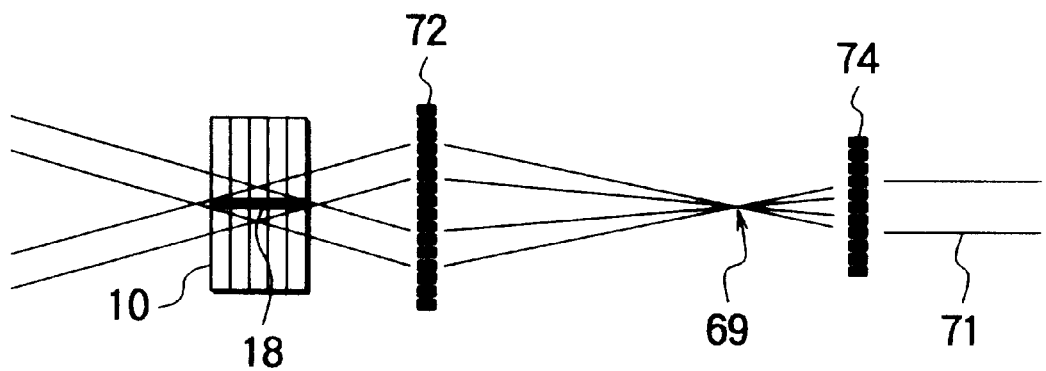
FIG. 16 illustrates part of the structure of a tenth embodiment.

The tenth embodiment, shown in FIG. 16, replaces the lenses 66, 68, and 70 of the ninth embodiment with zone plates 72 and 74 having equivalent functions.

The phase distribution function of zone plate 72, which combines the functions of the axicon lens 66 and first convex lens 68 of the ninth embodiment, is similar to the phase distribution function $\phi_4(\rho)$ of the single zone plate 62 in the seventh embodiment, except that the value of the parameter r used in deriving this phase distribution function is zero. The functions of lenses 66 and 68 in FIG. 15 can be combined into a single zone plate 72 in FIG. 16 because no phase difference occurs in the tubular parallel beam 67 between them. Zone plate 72 can be created by computer-generated holography.

Zone plate 74 in the tenth embodiment has the well-known phase distribution function of a spherical convex lens, given in the description of the sixth embodiment. If a spot rather than an output beam is required, zone plate 74 can be omitted.

The non-diffracting beam 18 in the tenth embodiment can be generated by any of the non-diffracting beam generators shown in the first eight embodiments.

The tenth embodiment has the advantage of a simplified structure and enhanced reliability, in that three lenses have been replaced by two zone plates. A further advantage is that the zone plates 72 and 74 can be substantially free of spherical aberration.

The ninth and tenth embodiments can be modified in various obvious ways. For example, the zone plate 72 of the tenth embodiment can be used together with the second convex lens 70 of the ninth embodiment, or with any equivalent collimating element.

Applications of the invented wavelength conversion device are not limited to information storage and laser printing. It is anticipated that the invention will be useful in many applications requiring small spots or beams of light of wavelengths not emitted by semiconductor lasers.

The invention is not limited to the structures shown in the preceding embodiments. In particular, the non-linear optical element does not have to have a QPM periodic domain inversion structure. Other types of phase matching can be employed, including angular phase matching, taking advantage of the birefringence of non-linear optical crystals.

The non-linear optical element need not be made of $LiNbO_3$. Lithium tantalate ($LiTaO_3$), which has similar non-linear optical properties, can be employed instead. The non-linear optical element may also have a multilayer structure comprising alternate layers of gallium phosphide (GaP) and gallium arsenide (GaAs), or any other known non-linear optical structure that results in wavelength conversion.

Those skilled in the art will recognize that further modifications are possible within the scope of the invention as claimed below.

What is claimed is:

1. A non-diffracting beam generator, comprising:
   a first optical system having a certain effective aperture, for focusing incident light to an annular image with a diameter less than half of said effective aperture, wherein said first optical system comprises a first zone plate, and
   a second optical system for generating a non-diffracting beam from said annular image, wherein said second optical system comprises:
      a first lens for collimating light from the annular image into a tubular parallel beam; and
      a second lens for generating said non-diffracting beam from the tubular parallel beam.

2. A non-diffracting beam generator:
   a first optical system having a certain effective aperture, for focusing incident light to an annular image with a diameter less than half of said effective aperture, and a second optical system for generating a non-diffracting beam from said annular image, wherein said second optical system comprises:
      a ring-shaped toroidal lens for collimating light from said annular image into a tubular parallel beam; and
      an axicon lens for generating said non-diffracting beam from said tubular parallel beam.

3. A non-diffracting beam generator, comprising:
   a first optical system having a certain effective aperture, for focusing incident light to an annular image with a diameter less than half of said effective aperture, and
   a second optical system for generating a non-diffracting beam from said annular image, wherein said second optical system comprises:
      a second zone plate for collimating light from said annular image into a tubular parallel beam; and
      an axicon lens for generating said non-diffracting beam from said tubular parallel beam.

4. A non-diffracting beam generator, comprising:
   a first optical system having a certain effective aperture, for focusing incident light to an annular image with a diameter less than half of said effective aperture, and
   a second optical system for generating a non-diffracting beam from said annular image, wherein said second optical system comprises:
      a ring-shaped toroidal lens for collimating light from said annular image into a tubular parallel beam; and
      a third zone plate for generating said non-diffracting beam from said tubular parallel beam.

5. The non-diffracting beam generator of claim 4, wherein said third zone plate has an optic axis, and wherein for coherent light having a first wavelength as the incident light to the first optical system, said third zone plate has a phase distribution $\phi(\rho)$ defined by $$\phi(\rho)=(\pi/\lambda)\rho^2(A^2-B^2)/[(Z_1-Z_2)\rho^3+(Z_2A^2-Z_2B^2)]$$

wherein, $\rho$ indicates distance from said optic axis, A and B are constants, $\lambda$ is said first wavelength, and $Z_1$ and $Z_2$ are distances from said third zone plate to starting and ending points of said non-diffracting beam.

6. A non-diffracting beam generator, comprising:
   a first optical system having a certain effective aperture, for focusing incident light to an annular image with a diameter less than half of said effective aperture, and a second optical system for generating a non-diffracting beam from said annular image, wherein said second optical system consists of a single zone plate.

7. A device for converting coherent light of a first wavelength, emitted by a semiconductor laser, to light of a second wavelength, comprising:
   a non-diffracting beam generator for receiving said coherent light of said first wavelength and generating from said coherent light a non-diffracting beam on a certain optic axis, wherein said non-diffracting beam generator directs said coherent light toward said optic axis at a uniform angle $\theta$;
   a half-mirror for mixing the coherent light of said first wavelength with coherent light of a fourth wavelength,
   a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element:
      performs second-harmonic generation and difference-frequency generation,
      produces a phase mismatch $\Delta k_D$ with respect to light of said first wavelength, said second wavelength, and said fourth wavelength propagating parallel to said optic axis, and
      has a periodic domain inversion structure with a period $\Lambda$ measured parallel to said optic axis, where $$\Lambda=(2\pi/\Delta k_D).$$

8. A device for converting coherent light of a first wavelength, emitted by a semiconductor laser, to light of a second wavelength, comprising:
   a non-diffracting beam generator for receiving said coherent light of said first wavelength and generating, from said coherent light, a non-diffracting beam on a certain optic axis; and a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element performs second-harmonic generation, wherein said non-linear optical element has a quasi-phase-matching structure and performs quasi-phase-matching for light of said first wavelength and light of said second wavelength, further comprising means for creating a phase delay in part of the non-diffracting beam, to compensate for dimensional error in the quasi-phase-matching structure.

9. A device for converting coherent light of a first wavelength, emitted by a semiconductor laser, to light of a second wavelength, comprising:

a non-diffracting beam generator for receiving said coherent light of said first wavelength and generating from said coherent light, a non-diffracting beam on a certain optic axis, wherein said non-diffracting beam generator has a flat surface for receiving said coherent light from said semiconductor laser, a reflective coating on said flat surface that partially reflects light of said first wavelength and transmits light of other wavelengths, for providing optical feedback to said semiconductor laser, thereby causing said semiconductor laser to operate at said first wavelength and a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element performs second-harmonic generation.

10. A device for converting coherent light of a first wavelength, emitted by a semiconductor laser, to light of a second wavelength, comprising:

a non-diffracting beam generator for receiving said coherent light of said first wavelength and generating, from said coherent light, a non-diffracting beam on a certain optic axis, wherein said non-diffracting beam generator has a flat surface, normal to said optic axis, for receiving said coherent light, a phase shifter disposed on said flat surface, and having a shape symmetrical about said optic axis, for creating a phase delay in part of the coherent light entering said non-diffracting beam generator, and a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element performs second-harmonic generation.

11. A device for converting coherent light of a first wavelength, emitted by a semiconductor laser, to light of a second wavelength, comprising:

a non-diffracting beam generator for receiving said coherent light of said first wavelength and generating, from said coherent light, a non-diffracting beam on a certain optic axis, wherein said non-diffracting beam generator includes a first optical system having a certain effective aperture, for receiving said coherent light from said semiconductor laser and focusing said coherent light to an annular image with a diameter less than half of said effective aperture, and a second optical system for generating said non-diffracting beam from said annular image; and a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element performs second-harmonic generation.

12. The wavelength conversion device of claim 11, wherein said non-linear optical element has a first thickness measured parallel to said optic axis, and said non-diffracting beam has a length equal to said first thickness.

13. The wavelength conversion device of claim 11, wherein said first optical system comprises a disc-shaped toroidal lens having a shape obtained as a solid of revolution about said optic axis, and having a second thickness, measured parallel to said optic axis, that first increases, then decreases, with increasing distance from said optic axis, said second thickness being greater at said optic axis than at an outer edge of said disc-shaped toroidal lens.

14. The wavelength conversion device of claim 11, wherein said first optical system comprises a first zone plate.

15. The wavelength conversion device of claim 11, wherein said second optical system comprises:

a ring-shaped toroidal lens for collimating light from said annular image into a first tubular parallel beam; and an axicon lens for generating said non-diffracting beam from said first tubular parallel beam.

16. The wavelength conversion device of claim 15, wherein said axicon lens has a flat surface, and said second optical system also comprises:

a phase shifter disposed on part of the flat surface of said axicon lens, for creating a phase delay in one part of said first tubular parallel beam, said one part being selected from among an inner part and an outer part of said first tubular parallel beam.

17. The wavelength conversion device of claim 11, wherein said second optical system comprises:

a second zone plate for collimating light from said annular image into a first tubular parallel beam; and an axicon lens for generating said non-diffracting beam from said first tubular parallel beam.

18. The wavelength conversion device of claim 17, wherein said axicon lens has a flat surface, and said second optical system also comprises:

a phase shifter disposed on part of the flat surface of said axicon lens, for creating a phase delay in one part of said first tubular parallel beam, said one part being selected from among an inner part and an outer part of said first tubular parallel beam.

19. The wavelength conversion device of claim 17, wherein said second zone plate creates a phase shift in one part of said first tubular parallel beam, said one part being selected from among an inner part and an outer part of said first tubular parallel beam.

20. The wavelength conversion device of claim 11, wherein said second optical system comprises:

a ring-shaped toroidal lens for collimating light from said annular image into a first tubular parallel beam; and a third zone plate for generating said non-diffracting beam from said first tubular parallel beam.

21. The wavelength conversion device of claim 20, wherein said third zone plate has a phase distribution $\phi(\rho)$ defined by $$\phi(\rho)=(\pi/\lambda)\rho^2(A^2-B^2)/[(z_1-z_2)\rho^2+(z_2A^2-z_1B^2)]$$

wherein, $\rho$ indicates distance from said optic axis, A and B are constants, $\lambda$ is said first wavelength, and $z_1$ and $z_2$ are distances from said third zone plate to starting and ending points of said non-diffracting beam.

22. The wavelength conversion device of claim 21, wherein said third zone plate creates a phase shift in one part of said non-diffracting beam.

23. The wavelength conversion device of claim 11, wherein said second optical system consists of a single zone plate.

24. The wavelength conversion device of claim 23, wherein said single zone plate creates a phase shift in one part of said non-diffracting beam.

25. A device for converting coherent light of a first wavelength, emitted by a semiconductor laser, to light of a second wavelength, comprising:
   a non-diffracting beam generator for receiving said coherent light of said first wavelength and generating, from said coherent light, a non-diffracting beam on a certain optic axis;
   a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element performs second-harmonic generation;
   an axicon collimator for receiving light of said second wavelength from said non-linear optical element, and forming said light of said second wavelength into a second tubular parallel beam; and
   a first convex lens for focusing said second tubular parallel beam to a super-resolved spot.

26. The wavelength conversion device of claim 25, further comprising:
   a collimating element for receiving light from said super-resolved spot and collimating the light thus received into a parallel beam.

27. A device for converting coherent light of a first wavelength, emitted by a semiconductor laser, to light of a second wavelength, comprising:
   a non-diffracting beam generator for receiving said coherent light of said first wavelength and generating, from said coherent light, a non-diffracting beam on a certain optic axis,
   a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element performs second-harmonic generation, and
   a fourth zone plate for receiving light of said second wavelength from said non-linear optical element, and focusing said light of said second wavelength to a super-resolved spot.

28. The wavelength conversion device of claim 27, further comprising:
   a collimating element for receiving light from said super-resolved spot and collimating the light thus received into a parallel beam.

29. A device for converting coherent light of a first wavelength, emitted by a semiconductor laser, to light of a second wavelength, comprising:
   a non-diffracting beam generator for receiving said coherent light of said first wavelength and generating, from said coherent light, a non-diffracting beam on a certain optic axis, wherein said non-diffracting beam generator directs said coherent light toward said optic axis at a uniform angle $\theta$; and
   a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element performs second-harmonic generation, wherein
   said non-linear optical element has a coherence length $1_c$ with respect to light of said first wavelength and light of said second wavelength propagating parallel to said optic axis, and
   said non-linear optical element has a periodic domain inversion structure with a period $\Lambda$ measured parallel to said optic axis, where $$\Lambda=2l_c=(\lambda/2)/(n_{sh}-n_f\cos\theta).$$

30. A device for converting coherent light of a first wavelength, emitted by a semiconductor laser, to light of a second wavelength, comprising:
   a non-diffracting beam generator for receiving said coherent light of said first wavelength and generating, from said coherent light, a non-diffracting beam on a certain optic axis, wherein said non-diffracting beam generator directs said coherent light toward said optic axis at a uniform angle $\theta$;
   a half-mirror for mixing the coherent light of said first wavelength with coherent light of a third wavelength,
   a bulk non-linear optical element disposed on said optic axis, for receiving said non-diffracting beam, and transmitting said non-diffracting beam in an unconfined manner while converting said non-diffracting beam from said first wavelength to said second wavelength, wherein said non-linear optical element:
   performs second-harmonic generation and sum-frequency generation,
   produces a phase mismatch $\Delta k_S$ with respect to light of said first wavelength, said second wavelength, and said third wavelength propagating parallel to said optic axis, and
   has a periodic domain inversion structure with a period $\Lambda$ measured parallel to said optic axis, where $$\Lambda=(2\pi/\Delta k_S).$$

31. A wavelength conversion method comprising the steps of:
   generating a non-diffracting beam including light of a first wavelength:
   directing said non-diffracting beam into a bulk non-linear optical element having a quasi-phase-matching structure, which converts said first wavelength to a second wavelength, said non-diffracting beam being directed toward an arbitrary point on a surface of said nonlinear optical element and not coupled into a waveguide: and
   creating a phase delay in part of said non-diffracting beam, to compensate for dimensional error in said quasi-phase-matching structure.

\* \* \* \* \*